United States Patent [19]

Black

[11] Patent Number: 4,742,848

[45] Date of Patent: May 10, 1988

[54] INDEXING CONTROL FOR FLUID FLOW REGULATING VALVES

[76] Inventor: Warren L. Black, Rte. 2, Box 23-A, Piney Flats, Tenn. 37686

[21] Appl. No.: 22,658

[22] Filed: Mar. 6, 1987

[51] Int. Cl.[4] ............................................. F16K 37/00
[52] U.S. Cl. ................................... 137/556.3; 251/297
[58] Field of Search ...................... 251/297; 137/556.3

[56] References Cited

U.S. PATENT DOCUMENTS

| | | | |
|---|---|---|---|
| 77,922 | 8/1905 | Sherman | 251/297 |
| 974,185 | 11/1910 | Quickel | 251/297 |
| 1,319,755 | 10/1919 | Cherry | 251/297 |
| 2,610,024 | 9/1952 | Wirth et al. | 251/297 |
| 2,698,731 | 1/1955 | Koehler et al. | 251/297 |
| 2,784,934 | 3/1957 | Pavlius, Jr. et al. | 251/297 |
| 2,906,288 | 9/1959 | Young | 251/297 |

Primary Examiner—A. Michael Chambers

[57] ABSTRACT

An indexing control for fluid flow regulating valve assembly having a valve body adapted for connection to a water source, a valve stem projecting outwardly from the body, and a knob affixed to the outer end of the stem for rotating the same, the indexing control comprising a first shoulder element supported in non-rotative position on the valve assembly, and a second shoulder element on the knob adapted to frictionally but slidably contact the first shoulder element as the knob is rotated, for imparting an indexing action thereto.

4 Claims, 2 Drawing Sheets

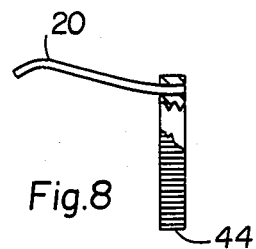
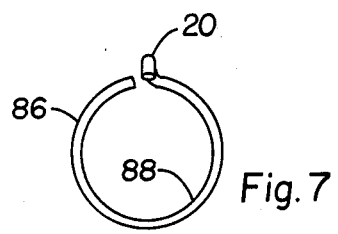
Fig. 8    Fig. 7
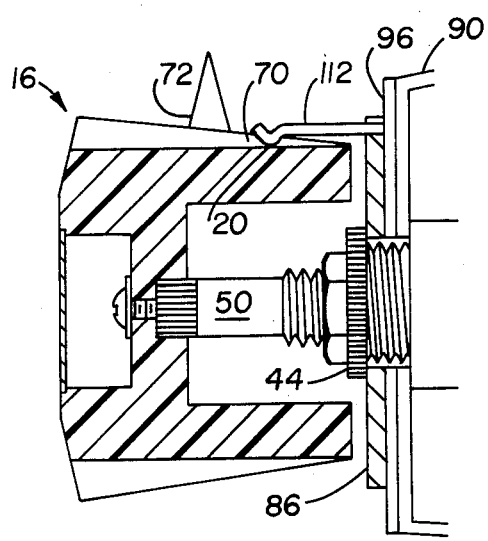
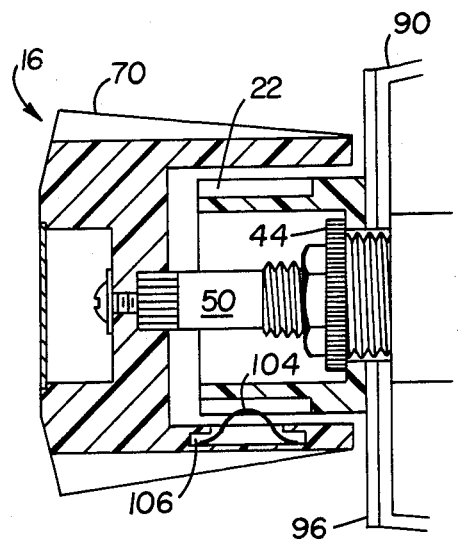
Fig. 6    Fig. 4
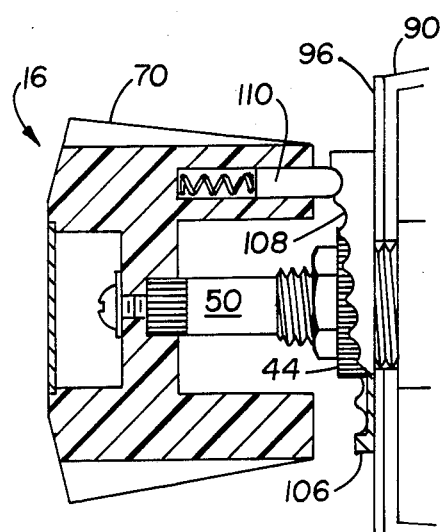
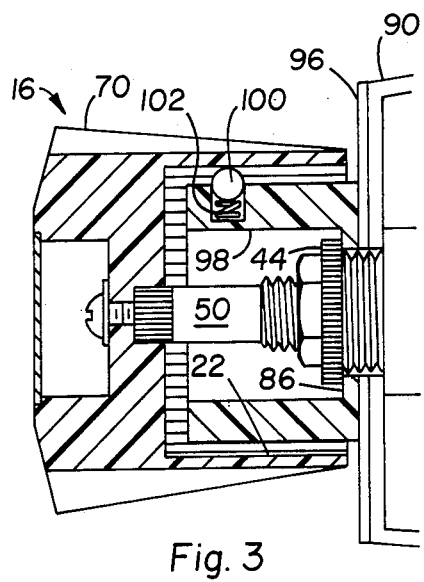
Fig. 5    Fig. 3

INDEXING CONTROL FOR FLUID FLOW REGULATING VALVES

This invention concerns fluid flow regulation valve construction having indexing control means for providing positive positioning of its opening and closing mechanism, and in particular concerns such indexing control means adapted for use on water faucets such as commonly used in sink, tub and shower facilities in the home or business.

Among the well recognized problems associated with faucets, in particular knob actuated types, is their tendency to drift or readjust themselves simply in response to water flow therethrough, which readjustment can be quite irritating and is always inconvenient. Also, considerable time as well as patience can be spent in initially adjusting the faucet to arrive at just the right water temperature, especially in the shower. Such difficulties appear necessary even though the temperature of the hot and cold water streams themselves have not changed substantially since their last use.

The present invention has as its principal objective to provide indexing control means adapted for use on various valves or faucets, either single knob or double knob, which will allow the user to quickly and conveniently set the hot and cold water streams at their desired flows.

This and further objectives have been attained in accordance with the present invention through the discovery of an indexing control for a fluid flow regulating valve assembly comprising valve body means adapted for connection to a water source, valve stem means projecting outwardly from said body means, and knob means affixed to the outer end of said stem means for rotating the same, the improvement being an indexing control comprising first shoulder means supported in no-rotative position on said valve body means, cavity means in the inner end of said knob means defined by generally circular wall means, and second shoulder means on said wall means adapted to frictionally but slidably contact said first shoulder means as said knob means is rotated, for imparting an indexing action thereto.

In certain embodiments of the invention, the following structure is preferred:

the first shoulder means comprises flexible finger means having a first component extending generally axially of said stem means, and a second component extending generally radially of said stem means, said second component adapted to flexibly, slidably contact said second shoulder means;

the second shoulder means comprises a plurality of slots formed in said wall means and extending generally axially of said stem means;

the slots are V or U shaped, preferably with rounded outer edges, and the finger means is comprised of one or more spring-like wire elements;

dial means is provided on said knob means and said body means to provide a visual display of the rotative position of said knob means;

the dial means comprises a pointer on said knob means and a dial plate on said body means;

the valve body is provided with a shoulder and clamp nut, and a facade is clamped between said shoulder and nut;

the first shoulder means has a base clamped onto said facade by said nut; and the valve body is provided with a shoulder and clamp nut, a facade is positioned adjacent said shoulder, and said dial plate is clamped onto said facade by said nut.

The invention will be further understood from the drawings and the following description thereof, wherein:

FIG. 3 is a cross-sectional view of a variation of the indexing control employing ball and detent;

FIG. 4 is a cross-sectional view of a variation of the indexing control employing spring and detent;

FIG. 5 is a cross-sectional view of a variation of the indexing control employing a notched ramp and spring loaded detent plunger;

FIG. 6 is a cross-sectional view of a variation of the indexing control employing an exterior first shoulder means;

FIG. 7 is an endwise elevational view of the preferred first shoulder means of the indexing control; and FIG. 8 is partially cross-sectional side view of a variation of the attachment for the first shoulder means.

Figure 1:
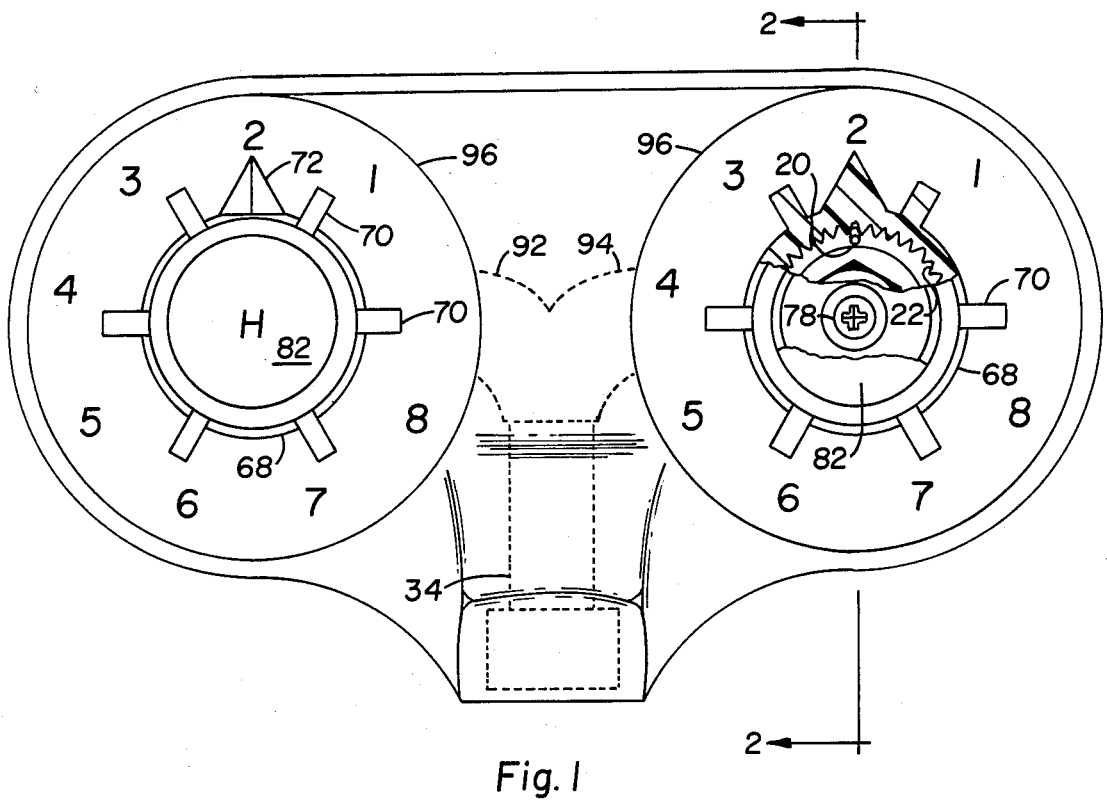
FIG. 1 is a top view, partially in section, of a typical dual faucet assembly embodying the present indexing control.

Referring to the drawings and to claim 1 hereof, the invention is embodied in a fluid flow regulating valve assembly generally designated 10, comprising valve body means generally designated 12 adapted for connection to a water source, valve stem means generally designated 14 projecting axially outwardly from said body means, and knob means generally designated 16 affixed to the outer fluted end 18 of said stem means for rotating the same, the improvement being an indexing control comprising first shoulder means 20 supported in non-rotative position on said assembly with respect to said knob means, and second shoulder means 22 on said knob means, at least one of said shoulder means being flexible and adapted to frictionally but slidably contact the other shoulder means as said knob means is rotated for imparting an indexing action thereto. The term "flexible" as used herein means that the shoulder can be temporarily forced out of the way of the other shoulder by a camming type of action.

In more detail, each of the valve body means generally designated 12, in the particular dual faucet shown herein for illustration, comprises a circular valve seat 24, an exteriorly threaded inlet 26 adapted for connection to either a hot or cold water source in conventional manner, and an internally threaded socket 30. The inlet chamber 32 of each valve body is interconnected to the faucet mixer section 34 which, in turn, is connected to the faucet outlet 36.

The valve stem means generally designated 14 comprises a nut section 38 having (a) exterior threads 40 for affixing the nut section to the mixer section 34 of the valve body means, (b) another set of exterior threads 42 for affixing, in cooperation with clamp nut 44, the valve body means 12 to various items as defined below, (c) a shoulder 46 and (d) washer 48 for providing a fluid-tight seal with the valve body means 12. The valve stem means also comprises (a) a shaft generally designated 50 having (b) threads mating with threads 54 of nut section 38 for imparting linear motion to the shaft, (c) circular seal grooves 56 for retaining (d) o-ring seals 58, (e) cavity 60 in its end for receiving (f) sealing washer 62 retained therein by (g) screw 64, and (h) the aforesaid flutes 18 or any other keying mechanism such as square or half-round segments on its outer end for non-rotatively affixing the knob means thereto in conventional manner.

The knob means, in the illustrative embodiment shown, generally designated 16 comprises generally circular body potion 68 having finger grip projections 70 thereon, pointer 72, cavity means 73 defined by wall means 74, and said second shoulder means 22, and internal flutes 76 for mating with flutes 18 to non-rotatively retain the knob on shaft 50 in cooperation with screw 78 threaded into the end of the shaft. A recess 80 in the outer end of the knob allows screw 78 to be hidden in cooperation with a snap-in face disc 82.

Figure 2:
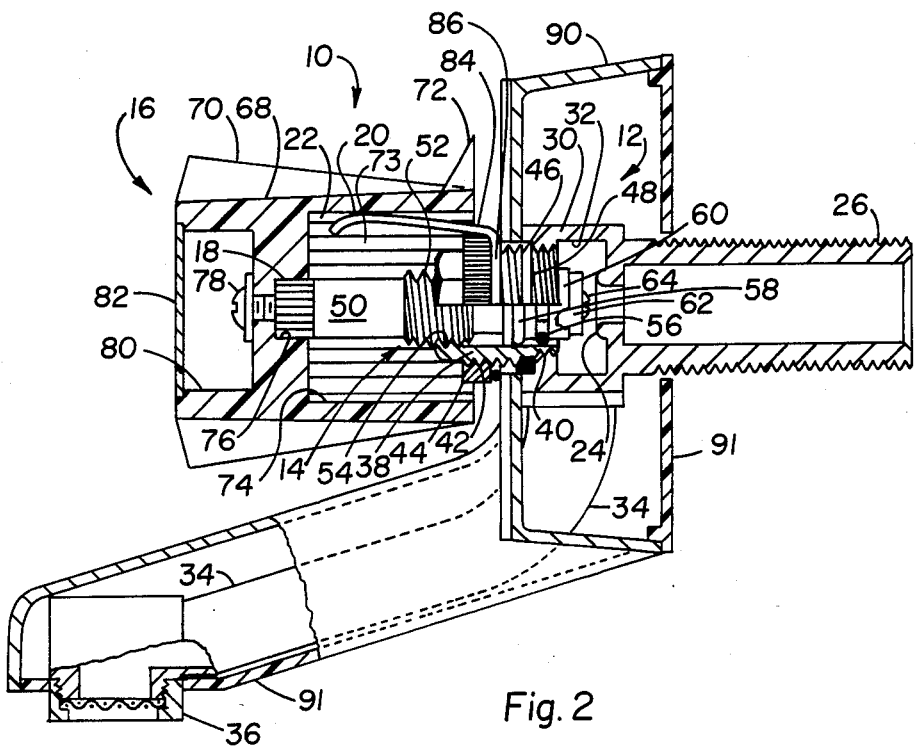
FIG. 2 is a cross-sectional view taken along line 2—2 of FIG. 1 in the direction of the arrows.

In the illustrative and most preferred embodiment of the invention shown in FIGS. 1 and 2, the indexing control comprises first shoulder means generally designated 20 (see FIG. 7) which constitutes a prominence on one or more flexible, spring-like wire fingers or elements 84 extending generally axially of shaft 50, and a base 86 apertured at 88 to fit over threads 42 of the nut section 38 to be clamped thereon by nut 44. This first shoulder means should be made of tough, flexible, spring-like material, preferably a single piece of stainless steel wire, preferably from about 1/32 to about 3/32 inch diameter, such that it can withstand repeated flexings as the knob is rotated and to offer the proper indexing feel. The knob may be of suitable tough plastic such as cellulose acetate butyrate or the like, but also may be of more lasting material such as stainless steel or brass to insure relative non-wearing of ridges or second shoulder means 22. It is noted that the length of ridges 22 are shown exaggerated in length since the actual maximum linear travel of shaft 50 is typically about ¼ inch or less.

The facade 90 is, of course, conventional and obscures the typical brass elements such as the valve bodies 12, mixing outlet pipe 34 and connecting lines 92 and 946 of a typical dual faucet. Plastic covers or seals 91 may be provided in conventional manner.

The dial plates 96 may be of any convenient shape, color and material such as brass, stainless or chrome steel, or plastic and may be larger or smaller than shown depending on the size of the knob. Numbers such as shown may be placed on the dial plates as well as other indicia. It is particularly noted that the indexing action of the present invention is such that audio setting is also possible in accordance with the number of clicks made by the rotation of the knob. In this regard the number of shoulders 22 or their depth in the knob wall 74, or their actual shape, i.e., sharp or rounded, may be varied to give a desired frequency and magnitude to both the indexing force or resistance and the sound emitted thereby. These shoulders 22 may, of course, also be spaced as desired to give the desired indexing feel.

Referring to FIG. 3, wherein equivalent structure to that previously described is numbered the same, base 86 is extended axially of shaft 50 either as one or a plurality of fingers or as a cup shaped wall 98, and carries one or more detent balls such as 100 urged toward shoulders 22 on the knob by a spring 102. Various equivalents of such structure may be employed such as shown in FIG. 4 as comprising one or more spring elements 104 which are flexed further into their supporting cavities 106 as shoulder 20 (preferably rounded) flattens the springs slightly during rotation of the knob. It is particularly noted that the positions of the elements of these mechanisms such as the ball and detent or spring and detent can be interchanged on either the knob 16 or shoulder means 20.

Referring to FIG. 5, another variation of the indexing means shows the first shoulder means as comprising a graduated circular ramp 106 having detents 108 (first shoulder means) into which a spring loaded plunger or ball 110 (second shoulder means) is forced as the knob is rotated. In FIG. 6, another variation of the indexing means shows the first shoulder means as comprising a spring wire 112 secured upright in a base 86 such as to contact the second shoulder means such as projections 70 on the exterior surface of the knob. In this embodiment, the pointer is conveniently placed over the top of wire 112. Referring to FIG. 8, a convenient way to provide the first shoulder means 20 is to imbed it firmly into the clamp nut 44.

The invention has been described in detail with particular reference to preferred embodiments thereof, but it will be understood that variations and modifications will be effected within the spirit and scope of the invention.

I claim:

1. A fluid flow regulating valve assembly comprising elongated valve body means adapted for connection to a water source, valve stem means rotatably threadedly mounted in and projecting outwardly from said body means, annular shoulder means on said body means, facade means having aperture means through which said body means is positioned with said facade means abutting said annular should means, nut means threadedly mounted on said body means and clamping said facade means against said annular shoulder means, knob means affixed to the outer end of said stem means and having axially slotted or ridged inner wall means defining cavity means, flexible finger means having a base adapted for clamping onto said body means by said nut means, said finger means having a first component extending generally axially of said stem means, and a second component extending generally radially of said stem means, said second component adapted to flexibly, slidably contact said inner wall means as said knob is rotated, for imparting an indexing action thereto.

2. The valve assembly of claim 1 wherein the slots are V or U shaped and the finger means is comprised of one or more spring-like wire elements;

3. The valve assembly of claim 1 wherein dial means is provided on said knob means and said body means to provide a visual display of the rotative position of said knob means;

4. The valve assembly of claim 1 wherein said dial means comprises a pointer on said knob means and a dial plate on said body means clamped against the upper surface of said facade means.

* * * * *